(12) United States Patent
Lim et al.

(10) Patent No.: US 8,054,395 B2
(45) Date of Patent: Nov. 8, 2011

(54) LIQUID CRYSTAL DISPLAY DEVICE AND FABRICATION METHOD THEREOF

(75) Inventors: Kyoung-Nam Lim, Gyeongsangbuk-Do (KR); Byoung-Ho Lim, Gumsi-Si (KR); Hwan Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 162 days.

(21) Appl. No.: 12/318,317

(22) Filed: Dec. 24, 2008

(65) Prior Publication Data

US 2009/0290083 A1 Nov. 26, 2009

(30) Foreign Application Priority Data

May 21, 2008 (KR) .................. 10-2008-0047123

(51) Int. Cl.
*G02F 1/136* (2006.01)

(52) U.S. Cl. .............. 349/43; 438/38; 438/155
(58) Field of Classification Search .......... None
See application file for complete search history.

(56) References Cited

U.S. PATENT DOCUMENTS

| | | | |
|---|---|---|---|
| 7,279,370 B2 * | 10/2007 | Lim et al. ............... | 438/155 |
| 2002/0074549 A1 * | 6/2002 | Park et al. ............... | 257/59 |
| 2005/0078233 A1 * | 4/2005 | Lim et al. ............... | 349/43 |
| 2007/0132903 A1 * | 6/2007 | Lim ......................... | 349/43 |

FOREIGN PATENT DOCUMENTS

| | | |
|---|---|---|
| KR | 10-2003-0042282 A | 5/2003 |
| KR | 10-2007-0003004 A | 1/2007 |
| KR | 10-2008-0002258 A | 1/2008 |

* cited by examiner

*Primary Examiner* — Thanh-Nhan Nguyen
(74) *Attorney, Agent, or Firm* — McKenna Long & Aldridge, LLP

(57) ABSTRACT

Disclosed is a method of fabricating a liquid crystal display (LCD) device in which a photosensitive film is selectively patterned using a half-tone mask, and then a portion of a passivation layer at a pixel area is selectively removed to secure an penetration path of a stripper. Additionally, a crack is generated on a conductive film formed on a photosensitive film pattern through a predetermined heat treatment to facilitate a lift-off process. Thus, the number of masks can be reduced to simplify the fabrication process of the LCD device and reduce fabrication costs.

15 Claims, 16 Drawing Sheets

LIQUID CRYSTAL DISPLAY DEVICE AND FABRICATION METHOD THEREOF

This application claims the benefit of Korean Patent Application No. 10-2008-0047123, filed on May 21, 2008, which is hereby incorporated by reference for all purposes as if fully set forth therein.

BACKGROUND OF THE INVENTION

1. Field of the Invention

The present invention relate to a display device and, more particularly, to a liquid crystal display (LCD) device and a fabrication method thereof. Although embodiments of the invention are suitable for a wide scope of applications, it is particularly suitable for simplifying a fabrication process, reducing fabrication costs and improving a production yield by reducing the number of masks.

2. Discussion of the Related Art

As consumers' interest in information displays grows and the demand for portable (mobile) information devices increases, research and commercialization of light and thin flat panel displays ("FPD") has increased.

Among FPDs, the liquid crystal display ("LCD") is a device for displaying images using optical anisotropy of liquid crystal. LCD devices exhibit excellent resolution and color and picture quality. Thus, LCD devices can be widely used for notebook computers or desktop monitors, and the like.

The LCD device includes a color filter substrate, an array substrate and a liquid crystal layer formed between the color filter substrate and the array substrate.

An active matrix (AM) driving method commonly used for the LCD is a method in which liquid crystal molecules in a pixel part are driven by using amorphous silicon thin film transistors (a-Si TFTs) as switching elements.

In the fabricating process of the LCD, a plurality of masking processes (namely, photolithographic processes) are performed to fabricate the array substrate including the TFTs. A method for reducing the number of masking process will increase productivity.

FIG. 1 is an exploded perspective view showing a related art LCD device.

As shown in FIG. 1, the LCD device includes a color filter substrate 5, an array substrate 10 and a liquid crystal layer 30 formed between the color filter substrate 5 and the array substrate 10.

The color filter substrate 5 includes a color filter (C) including a plurality of sub-color filters 7 that implement red, green and blue colors, a black matrix 6 for dividing the sub-color filters 7 and blocking light transmission through the liquid crystal layer 30, and a transparent common electrode 8 for applying a voltage to the liquid crystal layer 30.

The array substrate 10 includes gate lines 16 and data lines 17 which are arranged vertically and horizontally to define a plurality of pixel areas (P), TFTs (T), switching elements, formed at respective crossings of the gate lines 16 and the data lines 17, and pixel electrodes 18 formed on the pixel areas (P).

The color filter substrate 5 and the array substrate 10 are attached in a facing manner by a sealant (not shown) formed at an edge of an image display region to form a liquid crystal panel, and the attachment of the color filter substrates 5 and the array substrate 10 is made by an attachment key (not shown) formed on the color filter substrate 5 or the array substrate 10.

FIGS. 2A to 2E are cross-sectional views sequentially showing a fabrication process of the array substrate of the LCD device in FIG. 1.

As shown in FIG. 2A, a gate electrode 21 made of a conductive material is formed by using a photolithography process (a first masking process) on a substrate.

Next, as shown in 2B, a first insulating layer 15a, an amorphous silicon thin film and an n+ amorphous silicon thin film are sequentially deposited over the entire surface of the substrate 10 with the gate electrode 21 formed thereon, and the amorphous silicon thin film and the n+ amorphous silicon thin film are selectively patterned by using the photolithography process (a second masking process) to form an active pattern 24 formed of the amorphous silicon thin film on the gate electrode 21.

In this case, the n+ amorphous silicon thin film pattern 25 which has been patterned in the same form as the active pattern 24 is formed on the active pattern 24.

Thereafter, as shown in FIG. 2C, an opaque conductive film is deposited over the entire surface of the array substrate 10 and then selectively patterned by using a photolithography process (a third masking process) to form a source electrode 22 and a drain electrode 23 at an upper portion of the active pattern 24. At this time, a certain portion of the n+ amorphous silicon thin film pattern formed on the active pattern 24 is removed through the third masking process to form an ohmic-contact layer 25' between the active pattern 24 and the source and drain electrodes 22 and 23.

Subsequently, as shown in FIG. 2D, a second insulating layer 15b is deposited over the entire surface of the array substrate 10 with the source electrode 22 and the drain electrode 23 formed thereon, and a portion of the second insulating layer 15b is removed through a photolithography process (a fourth masking process) to form a contact hole 40 exposing a portion of the drain electrode 23.

Finally, as shown in FIG. 2E, a transparent conductive film is deposited over the entire surface of the array substrate 10 and then selectively patterned by using a photolithography process (a fifth making process) to form a pixel electrode 18 electrically connected with the drain electrode 23 via the contact hole 40.

As mentioned above, in fabricating the array substrate including TFTs, according to the related art, a total of five photolithography processes are necessarily performed to pattern the gate electrode, the active pattern, the source and drain electrodes, the contact hole and the pixel electrode.

The photolithography process is a process of transferring a pattern formed on a mask onto the substrate on which a thin film has been deposited to form a desired pattern, which includes a plurality of processes such as a process of coating a photosensitive solution, an exposing process and a developing process, etc, resulting in degradation of the production yield.

Generally, the masks designed for forming the patterns are quite expensive, so as the number of masks used in the processes increases, the fabrication cost of the LCD increases proportionally.

SUMMARY OF THE INVENTION

Accordingly, the present invention is directed to a liquid crystal display (LCD) and its fabrication method that substantially obviates one or more of the problems due to limitations and disadvantages of the related art.

An advantage of the present invention is to provide an LCD and its fabrication method capable of facilitating a lift-off by performing three masking processes.

Additional features and advantages of the invention will be set forth in the description which follows, and in part will be apparent from the description, or may be learned by practice of embodiments of the invention. These and other advantages of the embodiments of the invention will be realized and attained by the structure particularly pointed out in the written description and claims thereof as well as the appended drawings. To achieve these and other advantages and in accordance with the purpose of embodiments of the invention, as embodied and broadly described, a method for fabricating a liquid crystal display device, comprising: providing a first substrate divided into a pixel part and data and gate pad parts; depositing a first conductive film on the first substrate to form a gate electrode and a gate line at the pixel part of the first substrate through a first masking process; forming an insulating layer on the entire first substrate including the gate electrode and the gate line; forming an active pattern and source/drain electrodes at the pixel part of the first substrate and forming a data line crossing the gate line to define a pixel area through a second masking process; forming a passivation layer on the entire first substrate; forming first to third photosensitive film patterns having a first thickness and a fourth photosensitive film pattern having a second thickness on the passivation layer through a third masking process; selectively removing a portion of the passivation layer using the first to fourth photosensitive film pattern as a mask to form a first contact hole exposing a portion of the drain electrode; removing the fourth photosensitive film pattern and simultaneously forming fifth to seventh photosensitive film patterns having a third thickness; removing a portion of the passivation layer using the fifth to seventh photosensitive film patterns as masks; forming a transparent conductive film on the entire surface of the first substrate; forming at least one crack on the conductive film by heat treating the first substrate; removing the fifth to seventh photosensitive film patterns and simultaneously removing the transparent conductive film on the fifth to seventh photosensitive film patterns to form a pixel electrode electrically connected to the drain electrode via the first contact hole; and attaching the first substrate and a second substrate to each other using a sealant applied to outer edges of the substrates.

In another aspect, a liquid crystal display (LCD) device, comprises a gate electrode and a gate line on a first substrate; a gate insulating layer on the first substrate; an active pattern and source/drain electrodes on the gate insulating layer and a data line crossing the gate line to define a pixel area; a passivation layer on the first substrate and including a first passivation layer of a relatively high density and a second passivation layer of a relatively low density with respect to each other, wherein the second passivation layer is formed on the first passivation layer and the first passivation layer is thicker than the second passivation layer; a contact hole at the passivation layer and exposing a portion of the drain electrode; a pixel electrode electrically connected with the drain electrode via the contact hole; and a second substrate attached to the first substrate, wherein when the second passivation layer and portions of the first passivation layer are removed, the pixel electrode is positioned on the gate insulating layer and portions of the first passivation layer.

In another aspect, a method for fabricating a liquid crystal display, comprises: forming a gate electrode and a gate line on a substrate through a first making process; forming a gate insulating layer on the entire surface of the substrate; forming a semiconductor layer and source and drain electrodes separately at an upper portion of the semiconductor layer on the gate insulating layer, and forming a data line connected with the semiconductor layer and the source electrode and crossing the gate line to define a pixel area through a second masking process; forming a passivation layer with a first thickness on the entire surface of the substrate; forming a first photosensitive film pattern having a second thickness that corresponds to the data line, the gate electrode and the source electrode on the passivation layer, forming a second photosensitive film pattern having a third thickness thinner than the second thickness and corresponding to the pixel area of the substrate, wherein the passivation layer having the first thickness is exposed over the drain electrode through a third masking process; removing the exposed passivation layer having the first thickness over the drain electrode by using the first and second photosensitive film patterns as masks to form a contact hole exposing a portion of the drain electrode; performing an ashing process to remove the second photosensitive film pattern having the third thickness to expose the passivation layer having the first thickness, and simultaneously forming the first photosensitive film pattern having the second thickness as a third photosensitive film pattern with a fourth thickness that is thinner than the second thickness; etching the exposed passivation layer having the first thickness by using the third photosensitive film pattern with the fourth thickness as a mask to form a passivation layer with a fifth thickness that is thinner than the first thickness; forming a transparent conductive film at an upper portion of the third photosensitive film pattern having the fourth thickness and the passivation layer having the fifth thickness, the transparent conductive film contacting the drain electrode via the contact hole; performing a heat treatment to form at least one crack on the transparent conductive film at an upper portion of the third photosensitive film pattern having the fourth thickness; and performing a lift-off process to penetrate a striper through the at least one crack of the transparent conductive film to remove the third photosensitive film pattern having the fourth thickness and the upper transparent conductive film to form a pixel electrode formed of the transparent conductive film at the pixel area It is to be understood that both the foregoing general description and the following detailed description are exemplary and explanatory and are intended to provide further explanation of embodiments as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF ILLUSTRATED EMBODIMENTS

Reference will now be made in detail to embodiments of the present invention, examples of which are illustrated in the accompanying drawings.

The liquid crystal display (LCD) device and its fabrication method will now be described in detail with reference to the accompanying drawings.

Figure 1:
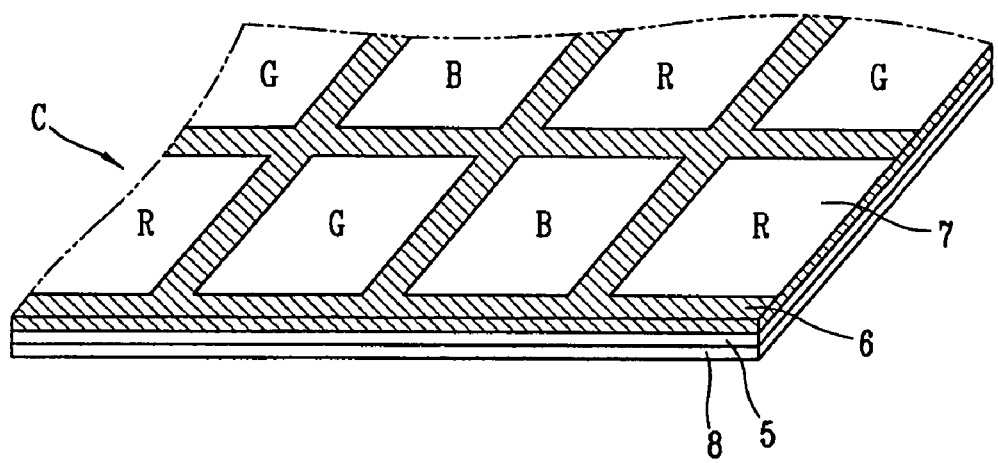
FIG. 1 is an exploded perspective view showing a general liquid crystal display (LCD)
Figure 1:
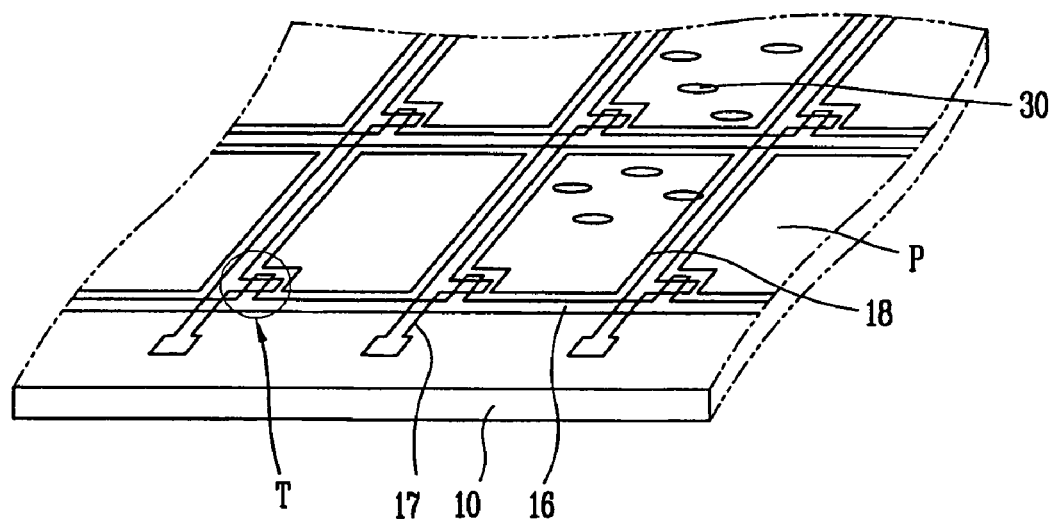
Figure 2A:
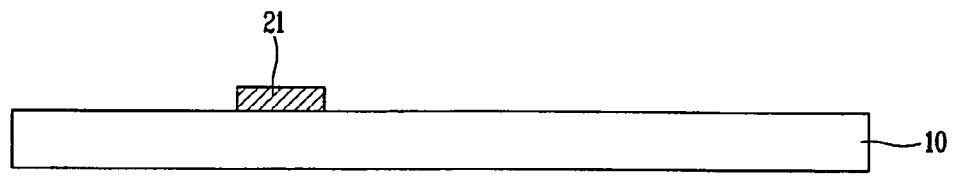
FIGS. 2A to 2E are cross-sectional views sequentially showing a fabrication process of an array substrate of the LCD device in FIG. 1.
Figure 2B:
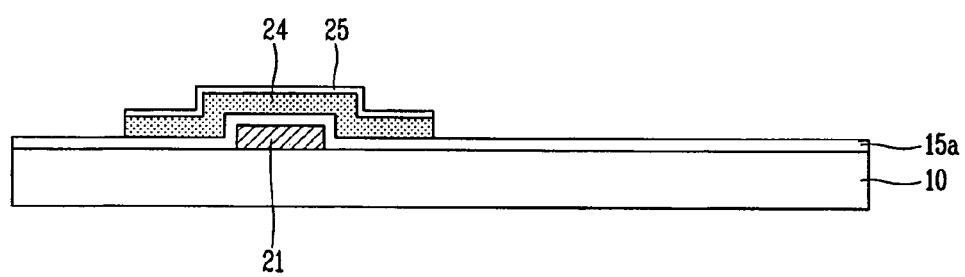
Figure 2C:
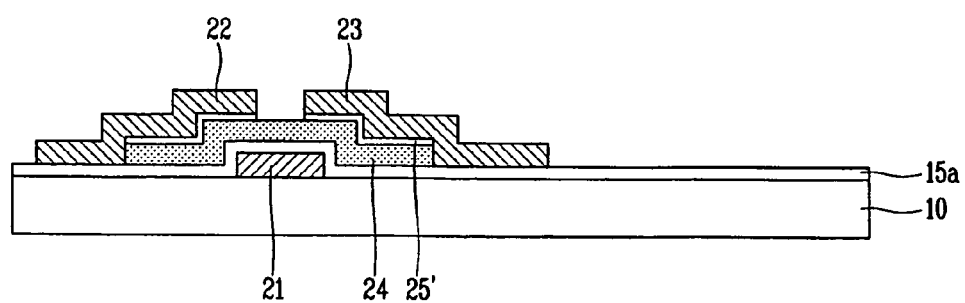
Figure 2D:
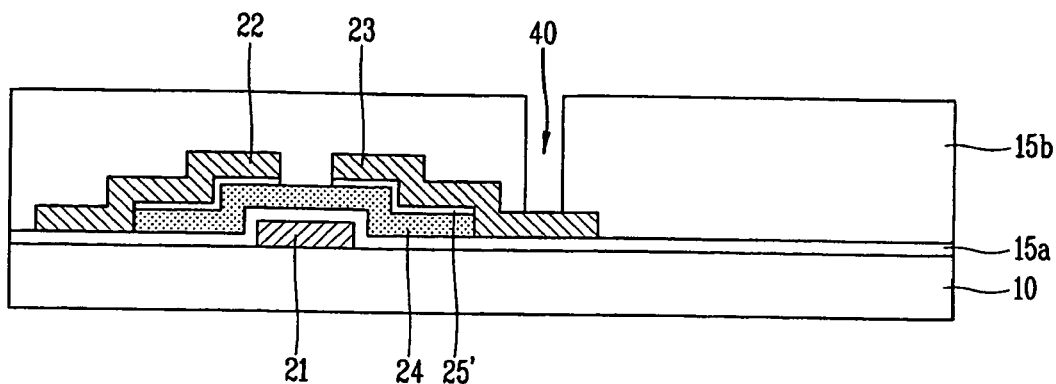
Figure 2E:
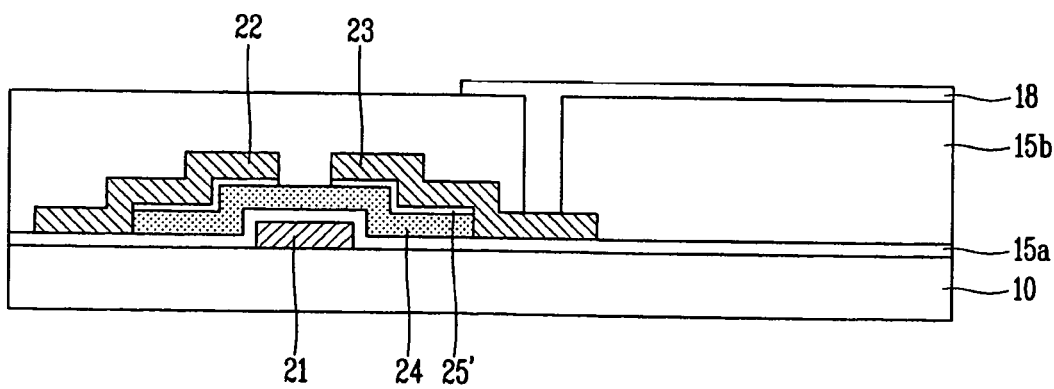
Figure 3:
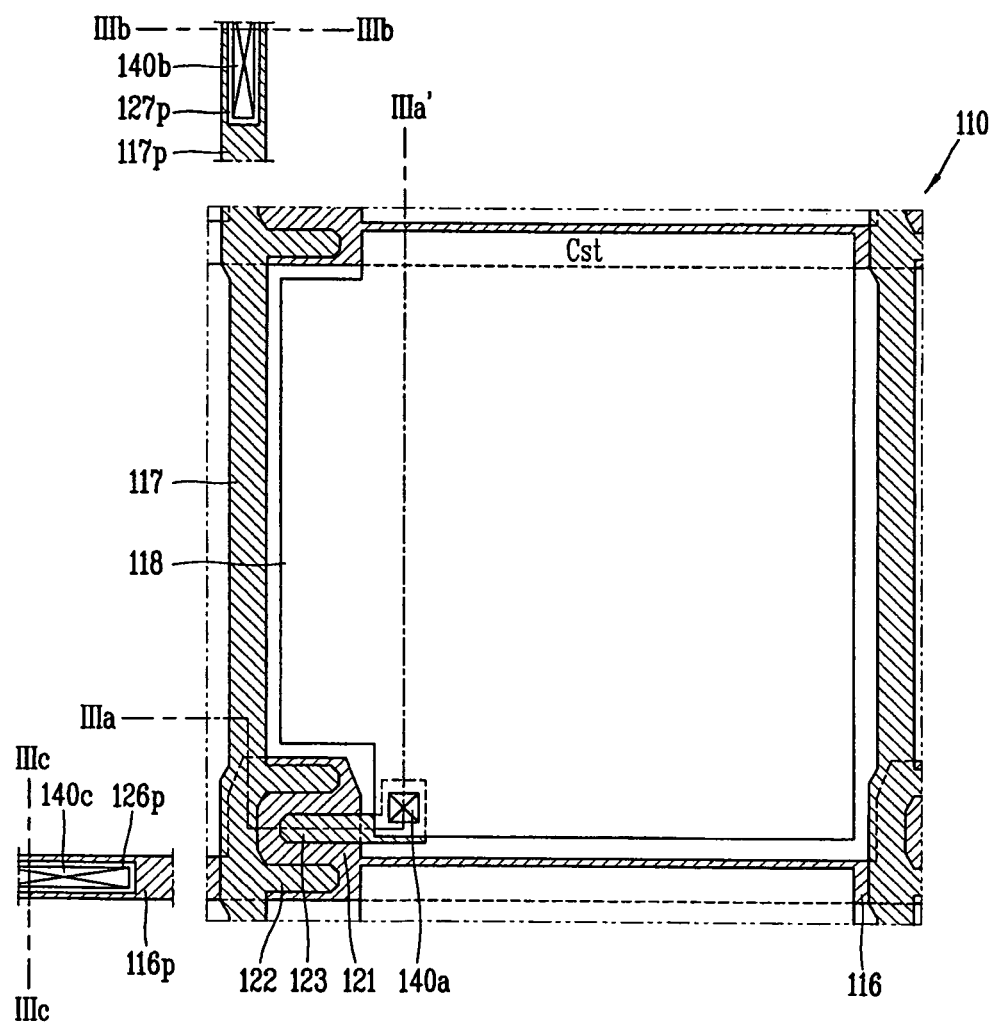
FIG. 3 is a plan view showing a portion of an array substrate of an LCD device according to an embodiment of the present invention.

FIG. 3 is a plan view showing a portion of an array substrate of an LCD device according to an embodiment of the present invention, in which a single pixel including a gate pad part and a data pad part are shown for the sake of explanation.

The N number of gate lines and the M number of data lines are formed to cross each other to define M×N number of pixels. To simplify the explanation, only a single pixel is shown.

As shown in FIG. 3, gate lines 116 and the data lines 117 are formed to be arranged vertically and horizontally to define the pixel area on an array substrate 110. A thin film transistor (TFT), a switching element, is formed at a crossing of the gate line 116 and the data line 117. A pixel electrode 118 is formed within the pixel area and connected with the TFT to drive liquid crystals (not shown) together with a common electrode of a color filter substrate (not shown).

The TFT includes a gate electrode 121 forming a portion of the gate line 116, a source electrode 122 connected with the data line 117, and a drain electrode 123 connected with the pixel electrode 118. The TFT also includes an active pattern (not shown) for forming a conductive channel between the source and drain electrodes 122 and 123 by a gate voltage supplied to the gate electrode 121.

In the embodiment of the present invention, a 'U'-shaped TFT having a 'U'-shaped source electrode 122 is illustrated as an example, but the present invention is not limited thereto and can be applicable to any TFT regardless of their shape.

A portion of the source electrode 122 extends in one direction to form a portion of the data line 117, and a portion of the drain electrode pattern extends to the pixel area so as to be electrically connected via a first contact hole 140a formed at a passivation layer (not shown).

A portion of the previous gate line 116 overlaps with a portion of the upper pixel electrode 118 with a gate insulating layer (not shown) and the passivation layer interposed therebetween to form a storage capacitor Cst. The storage capacitor Cst serves to uniformly maintain voltage applied to a liquid crystal capacitor until a next signal is received. Namely, the pixel electrode 118 of the array substrate 110 forms the liquid crystal capacitor together with the common electrode of the color filter substrate. In general, the voltage applied to the liquid crystal capacitor is not maintained until the next signal is received, but rather leaked. Thus, in order to maintain the applied voltage, the storage capacitor Cst should be connected with the liquid crystal capacitor for its use.

Besides maintaining the voltage signal, the storage capacitor may also have the effect of stabilizing a gray scale representation, reducing flickering effects, reducing the formation of residual images, and the like.

A gate pad electrode 126p and a data pad electrode 127p are formed at edge portions of the array substrate 110 and electrically connected with the gate line 116 and the data line 117, respectively, and transfer a scan signal and a data signal applied from an external driving circuit unit (not shown) to the gate line 116 and the data line 117, respectively.

Namely, the gate line 116 and the data line 117 extend to the driving circuit unit so as to be connected with the corresponding gate pad line 116p and the data pad line 117p, and the gate pad line 116p and the data pad line 117p receive the scan signal and the data signal from a driving circuit unit through the gate pad electrode 126p and the data pad electrode 127p electrically connected with the gate pad line 116p and the data pad line 117p.

In this case, the data pad electrode 127p is electrically connected with the data pad line 117p via a second contact hole 140b and the gate pad electrode 126p is electrically connected with the gate pad line 116p via a third contact hole 140c.

Here, in the LCD device according to the embodiment of the present invention, the active pattern, the source/drain electrodes and the data line are formed through a single masking process by using a half-tone mask or a diffraction (slit) mask (hereinafter, it is assumed that when the half-tone mask is referenced, it also includes the diffraction mask), and the contact hole of the passivation layer and the pixel electrode are simultaneously formed through a single masking process by using the half-tone mask and a lift-off process, to thus fabricate the array substrate through a total of three masking processes. This will now be described in detail.

In the LCD device according to an embodiment of the present invention, a photosensitive film is selectively patterned by using the second half-tone mask to form a contact hole, and a portion of the thickness of the passivation layer at the pixel area is selectively removed to secure an penetration path of a striper. Namely, in the current three-mask structure, the source and drain electrodes are completed, a photosensitive film pattern is formed on the protection layer, and then the passivation layer and the gate insulating layer at the contact hole area and the pixel area are completely removed, thereby forming such an penetration path of the striper below the photosensitive film pattern. Thereafter, a conductive film is deposited and stripping is performed for a lift-off operation. In this case, there is difficulty in forming a profile at the pad part. For example, quality may be degraded due to a disconnection in an ITO jumping, and because the passivation layer and the gate insulating layer are all etched, an undercut occurs at the source and drain electrodes. Thus, in order to avoid this problem, chloride (Cl) gas is used for etching the source and drain electrodes. However, in this case, the gate pad line of the gate pad part is corroded.

Thus, in the present invention, as described above, after the contact hole is formed by using the half-tone mask, the photosensitive film is patterned one more time to remove only a portion of the thickness of the passivation layer at the pixel area to form the minimum penetration path of the striper without causing the problem of corrosion of the gate pad part. Also, in addition to the penetration path for the striper, the crack is formed on the conductive film formed on the photosensitive film pattern owing to the thermal expansion of the photosensitive film pattern through heat treatment, the lift-off process can be easily performed.

Figure 4A:
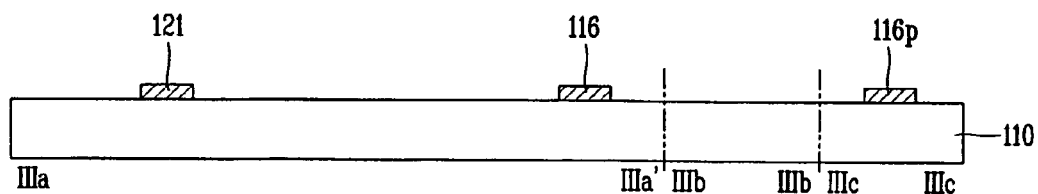
FIGS. 4A to 4C are cross-sectional views sequentially showing a fabrication process taken along lines IIIa-IIIa', IIIb-IIIb and IIIc-IIIc of the array substrate in FIG. 3.
Figure 4B:
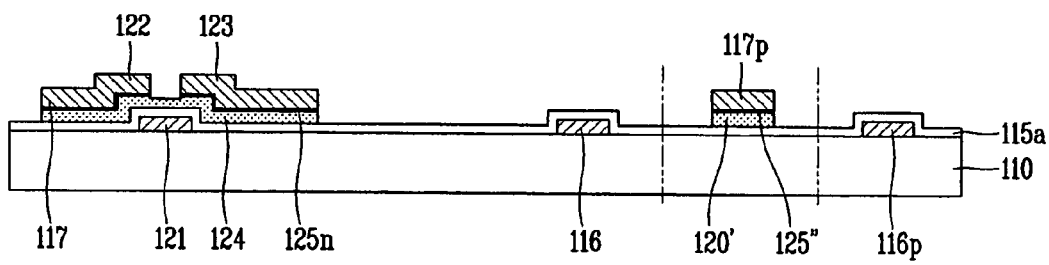
Figure 4C:
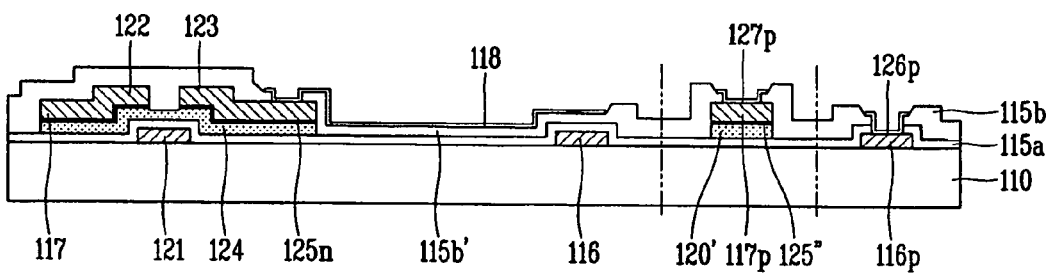

FIGS. 4A to 4C are cross-sectional views sequentially showing a fabrication process taken along lines IIIa-IIIa', IIIb-IIIb and IIIc-IIIc of the array substrate in FIG. 3. The left side shows the process of fabricating the array substrate of the pixel part and the right side shows the sequential process of fabricating the array substrate of the data pad part and the gate pad part.

Figure 5A:
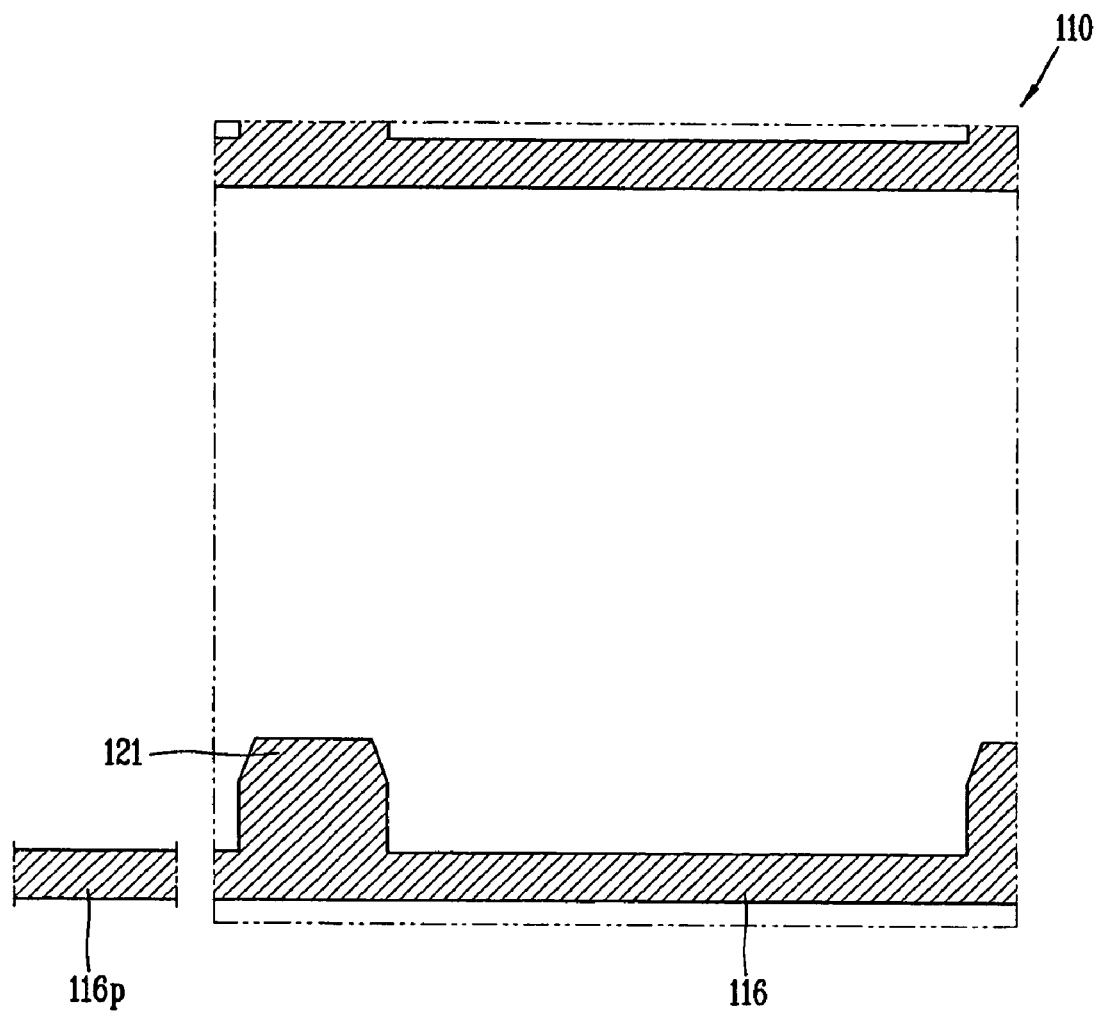
FIGS. 5A to 5C are plan views sequentially showing the fabrication process of the array substrate in FIG. 3.
Figure 5B:
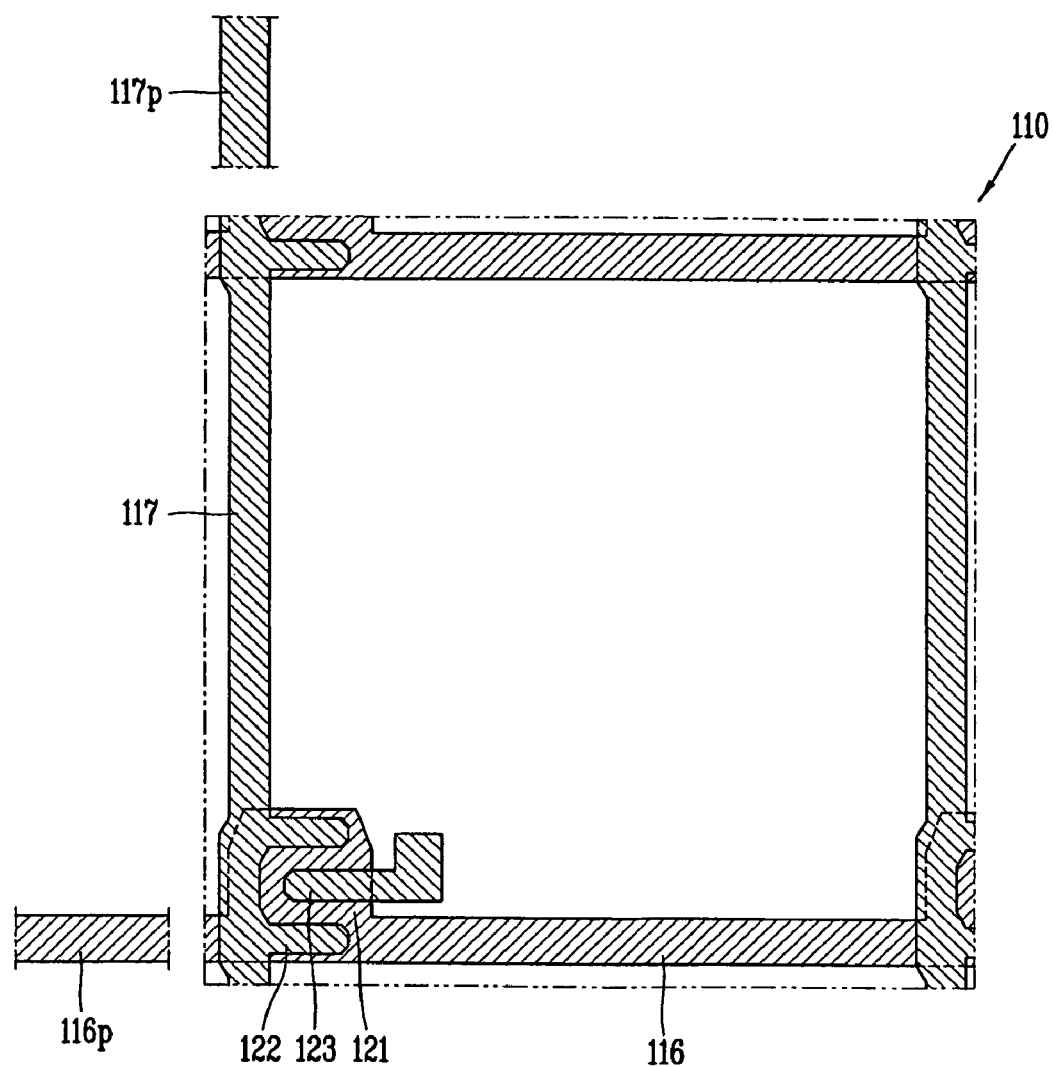
Figure 5C:
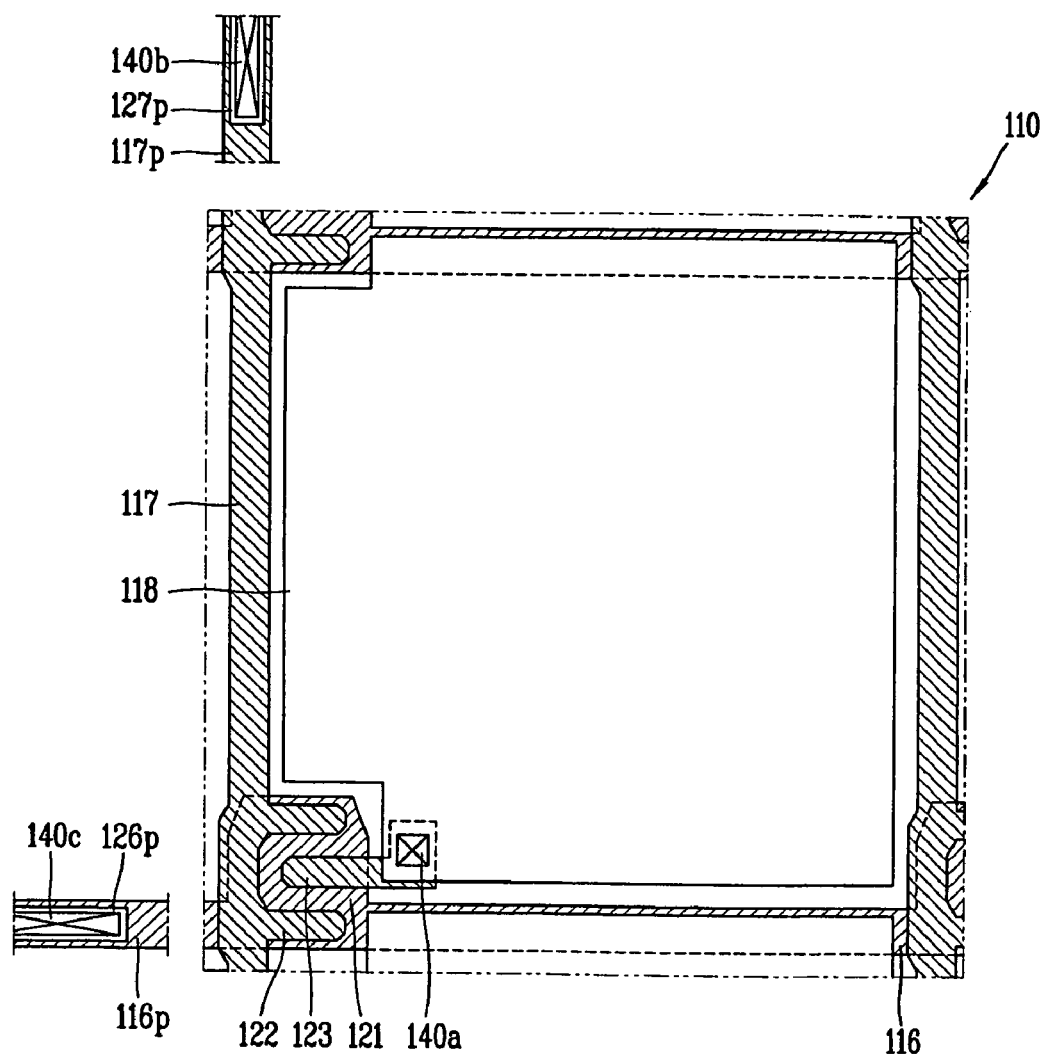

FIGS. 5A to 5C are plan views sequentially showing the fabrication process of the array substrate in FIG. 3.

As shown in FIGS. 4A and 5A, the gate line 116 including the gate electrode 121 is formed at the pixel part of the array substrate 110 made of a transparent insulation material such as glass, and the gate pad line 116p is formed at the gate pad part of the array substrate 110.

In this case, the gate electrode 121, the gate line 116, and the gate pad line 116p are formed by depositing a first conductive film on the substrate and then selectively patterning them through a photolithography process (a first masking process).

Here, the first conductive film can be made of a low-resistance opaque conductive material such as aluminum (Al), an aluminum alloy, tungsten (W), copper (Cu), chromium (Cr), molybdenum (Mo), or the like. Also, the first conductive film 130 may be formed with a multi-layered structure by stacking two or more low-resistance conductive materials.

Next, as shown in FIGS. 4B and 5B, a gate insulating layer 115a, an amorphous silicon thin film, an n+ amorphous silicon thin film, and a second conductive film are formed on the entire surface of the array substrate 110 with the gate electrode 121, the gate line 116, and the gate pad line 116p formed thereon, and then selectively removed through a photolithography process (a second masking process) to form an active pattern 124 formed of the amorphous silicon thin film and the source and drain electrodes 122 and 123 formed of the second conductive film and electrically connected with the source and drain regions of the active pattern 124 at the pixel part of the array substrate 110.

In addition, the data pad line 117p formed of the second conductive film is formed at the data pad part of the array substrate 110 through the second masking process.

At this time, an ohmic-contact layer 125n, which is formed of the n+ amorphous silicon thin film and has been patterned in the same shape as the source and drain electrodes 122 and 123, is formed on the active pattern 124.

A first amorphous silicon thin film pattern 120' and a second n+ amorphous silicon thin film pattern 125", which are formed of the amorphous silicon thin film and the n+ amorphous silicon thin film and have been patterned in the same shape as the data pad line 117p, are formed under the data pad line 117p.

Here, in the first embodiment of the present invention, the active pattern 124, the source and drain electrodes 122 and 123, and the data line 117 are simultaneously formed through the single masking process (the second masking process) by using a half-tone mask. The second masking process will now be described in detail with reference to the accompanying drawings.

FIGS. 6A to 6F are cross-sectional views substantially showing a second masking process in FIGS. 4B and 5B.

Figure 6A:
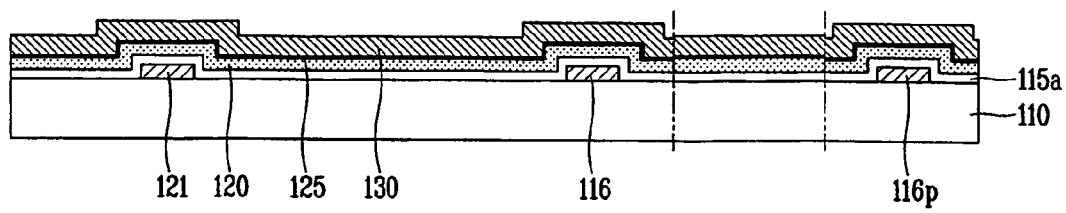
FIGS. 6A to 6F are cross-sectional views substantially showing a second masking process in FIGS. 4B and 5B.

As shown in FIG. 6A, the gate insulating layer 115a, the amorphous silicon thin film 120, an n+ amorphous silicon thin film 125, and a second conductive film 130 are formed on the entire surface of the array substrate 110 with the gate electrode 121, the gate line 116, and the gate pad line 116p formed thereon.

The second conductive film 130 may be made of a low-resistance opaque conductive material such as aluminum (Al), an aluminum alloy, tungsten (W), copper (Cu), chromium (Cr), molybdenum (Mo), a molybdenum alloy, or the like, in order to form the source electrode, the drain electrode, and the data line.

Figure 6B:
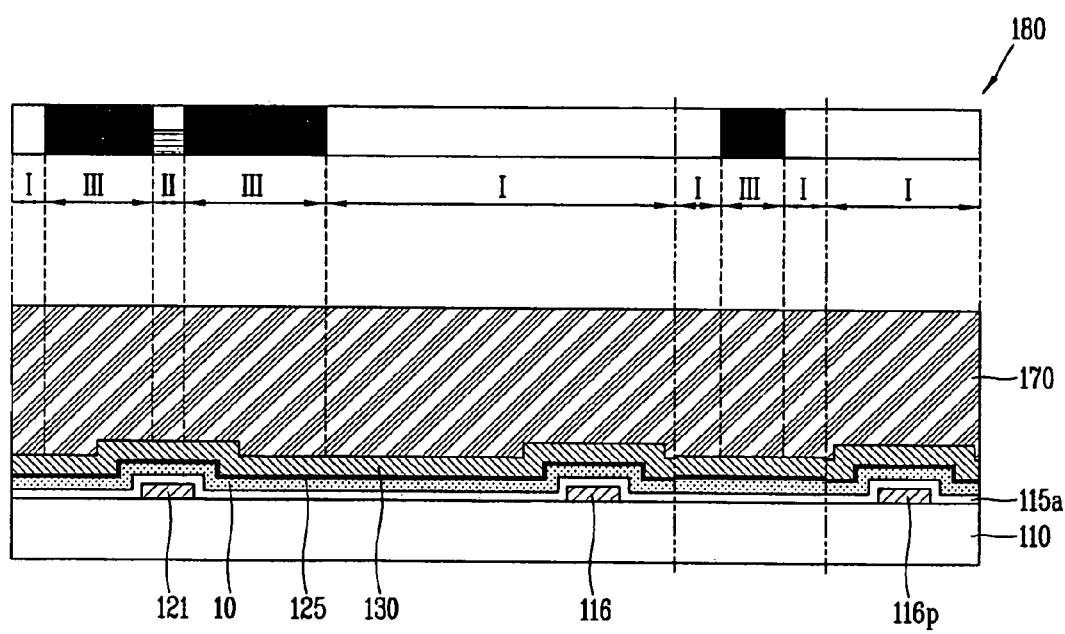

As shown in FIG. 6B, a first photosensitive film 170 made of a photosensitive material such as photoresist is formed on the entire surface of the array substrate 110, to which light is selectively irradiated via the half-tone mask 180.

The half-tone mask 180 includes a first transmission region (I) that allows irradiated light to be entirely transmitted therethrough, a second transmission region (II) that allows only some light to be transmitted therethrough while blocking the remaining light, and a blocking region (III) that entirely blocks the irradiated light. Only light which has transmitted through the half-tone mask 180 can be irradiated on the first photosensitive film 170.

Figure 6C:
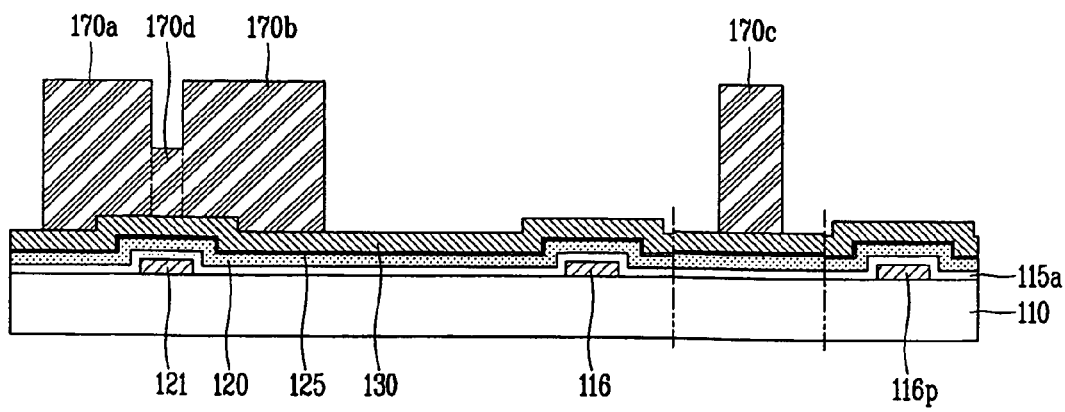

Subsequently, when the first photosensitive film 170 which has been exposed through the half-tone mask 180 is developed, as shown in FIG. 6C, first to fourth photosensitive film patterns 170a to 170d remain at regions where light has been entirely blocked or partially blocked through the blocking region (III) and the second transmission region (II), while the first photosensitive film 170 at the transmission region (I) through which light had been entirely transmitted has been completely removed to expose the surface of the second conductive film 130.

At this time, the first to third photosensitive film patterns 170A to 170C formed at the blocking region (III) are thicker than the fourth photosensitive film pattern 170d formed through the second transmission region (II). In addition, the first photosensitive film 170 at the region where the light had entirely transmitted through the first transmission region (I) has been completely removed. This is because positive photoresist has been used, but without being limited thereto, negative photoresist can be also used in the present invention.

Figure 6D:
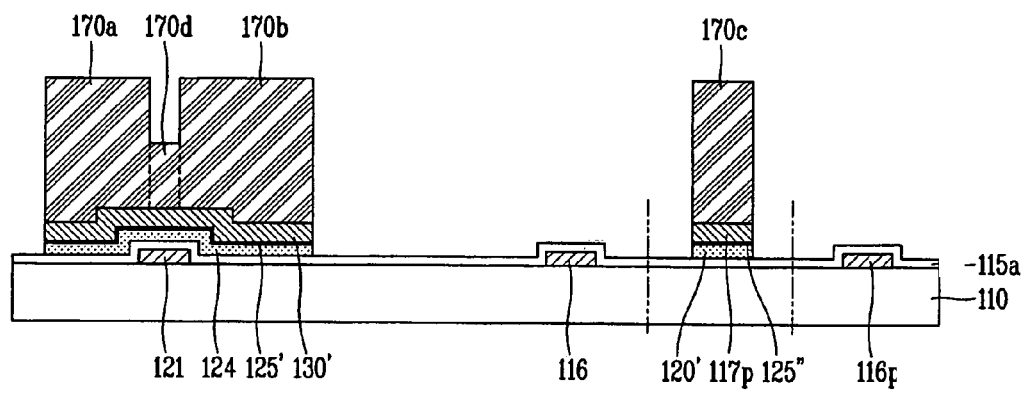

And then, as shown in FIG. 6D, the lower amorphous silicon thin film, the n+ amorphous silicon thin film, and the second conductive film are selectively removed by using the first to fourth photosensitive film patterns 170a to 170d as masks to form the active pattern 124 at the pixel part of the array substrate 110 and the data pad line 117p formed of the second conductive film at the data pad part of the array substrate 110.

At this time, a first n+ amorphous silicon thin film pattern 125' and a second conductive film pattern 130', which are formed of the n+ amorphous silicon thin film and the second conductive film, respectively, and have been patterned in the same shape as the active pattern 124, are formed on the active pattern 124.

Also, a first amorphous silicon thin film pattern 120' and a second n+ amorphous silicon thin film pattern 125", which are formed of the amorphous silicon thin film and the n+ amorphous silicon thin film and have been patterned in the same shape as the data pad line 117p, are formed below the data pad line 117p.

Figure 6E:
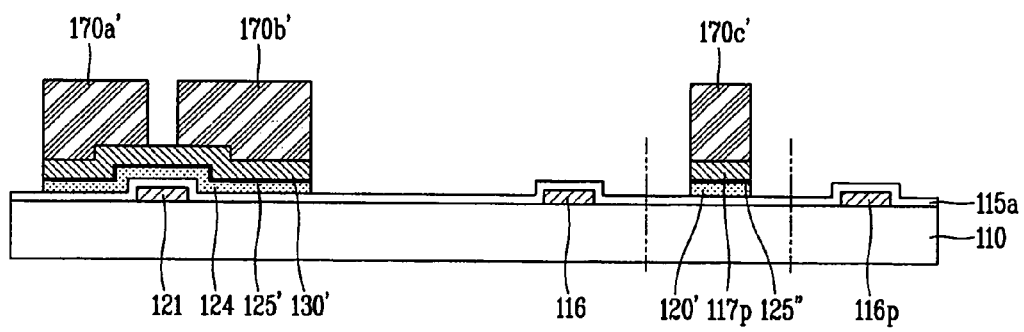

Thereafter, an ashing process is performed to partially remove the first to fourth photosensitive film patterns 170a to 170d. Then, as shown in FIG. 6E, the fourth photosensitive film pattern at the second transmission region (II) is completely removed.

Then, the first to third photosensitive film patterns remain as fifth to seventh photosensitive film patterns 170a' and 170c' by removing the thickness of the fourth photosensitive film pattern only on source and drain electrode regions, and the data pad line 117p corresponding to the blocking region (III).

Figure 6F:
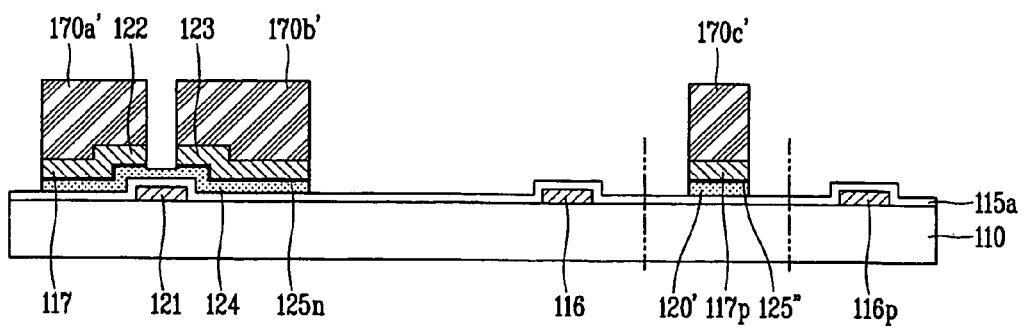

Thereafter, as shown in FIG. 6F, a portion of the second conductive film pattern is selectively removed by using the remaining fifth to seventh photosensitive film patterns 170a' to 170c' as masks to form the source and drain electrodes 122 and 123 and the data line 117 formed of the second conductive film at the pixel part of the array substrate 110.

At this time, the ohmic-contact layer 125n formed of the n+ amorphous silicon thin film and allowing the source and drain regions of the active pattern 124 and the source and drain electrodes 122 and 123 to ohmic-contact with each other is formed on the active pattern 124.

In this manner, in the first embodiment of the present invention, the active pattern 124, the source and drain electrodes 122 and 123, and the data line 117 can be formed through a single masking processing by using the half-tone mask.

Thereafter as shown in FIGS. 4C and 5C, a passivation layer 115b is formed on the entire surface of the array substrate 110 with the active pattern 124 formed thereon and then selectively removed through a photolithography process (a third masking process) to form a first contact hole 140a exposing a portion of the drain electrode 123 at the pixel part of the array substrate 110, and second and third contact holes 140b and 140c exposing portions of the data pad line 117p and the gate pad line 116p at the data pad part and the gate pad part of the array substrate 110, respectively.

At this time, through the third masking process, the pixel electrode 118, which is formed of the third conductive film and electrically connected with the drain electrode 123 via the first contact hole 140a, is formed at the pixel part of the array substrate. In addition, the data pad electrode 127p and the gate pad electrode 126p, which are formed of the third conductive film and electrically connected with the data pad line 117p and the gate pad line 116p, are formed at the data pad part and the gate pad part of the array substrate 110.

In the embodiment of the present invention, a passivation layer pattern 115b' is formed by removing a portion of the thickness of the passivation layer 115b, and the pixel electrode 118 is formed on the passivation layer pattern 115b'.

Here, the third masking process can use the half-tone mask and the lift-off process, whereby the first to third contact holes 140a to 140c can be formed and, at the same time, the pixel electrode 118, the data pad electrode 127p and the gate pad electrode 126p, which are electrically connected with the drain electrode 123, the data pad line 117p and the gate pad line 116p via the first to third contact holes 140a to 140c, can be formed. The third masking process will now be described with reference to the accompanying drawings.

FIGS. 7A to 7H are cross-sectional views substantially showing the third masking process in FIGS. 4C and 5C.

Figure 7A:
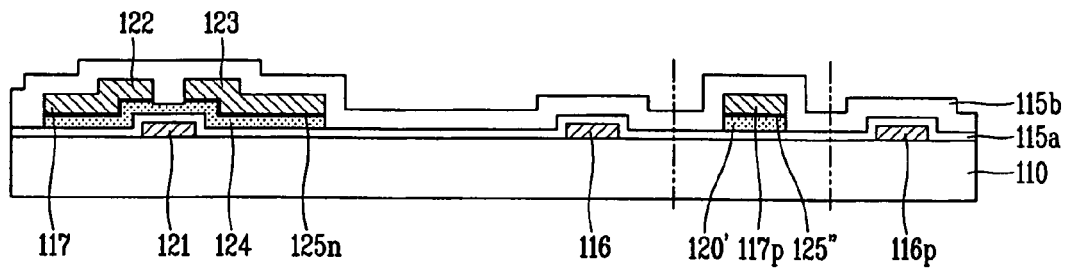
FIGS. 7A to 7H are cross-sectional views substantially showing a third masking process in FIGS. 4C and 5C.

As shown in FIG. 7A, the passivation layer 115b is formed on the entire surface of the array substrate 110 with the active pattern 124, the source electrode 122 and the drain electrode 123 formed thereon.

Here, the passivation layer 115b may be formed of an inorganic insulating layer such as a silicon nitride film or a silicon oxide film, or may be formed of an organic insulating layer such as photoacryl or benzocyclobutene (BCB).

The passivation layer 115b may be formed as a dual-layer of a first passivation layer with a relatively high density and a second passivation layer with a relatively low density with respect to each other, and where the first passivation layer is thicker than the second passivation layer. For example, when the passivation layer is formed of two layers of $SiN_x$ having a first layer thicker than the second layer, the gas flow ratio is approximately 3000 $SiH_4$ to 2800 $NH_3$ (i.e., 1:0.93) for the first layer, and the ratio for the second layer is 2800 $SiH_4$ to 6800 $NH_3$ (i.e., 1:2.43). In this case, when the first passivation layer of the higher density is being etched after the second passivation layer of the lower density is etched, because etching is more actively performed horizontally, namely, in the lateral direction of the second passivation layer than the etching performed in the vertical direction on the first passivation layer, an infiltration path of a striper can be sufficiently secured in the state that a portion of the thickness of the first passivation layer remains.

Figure 7B:
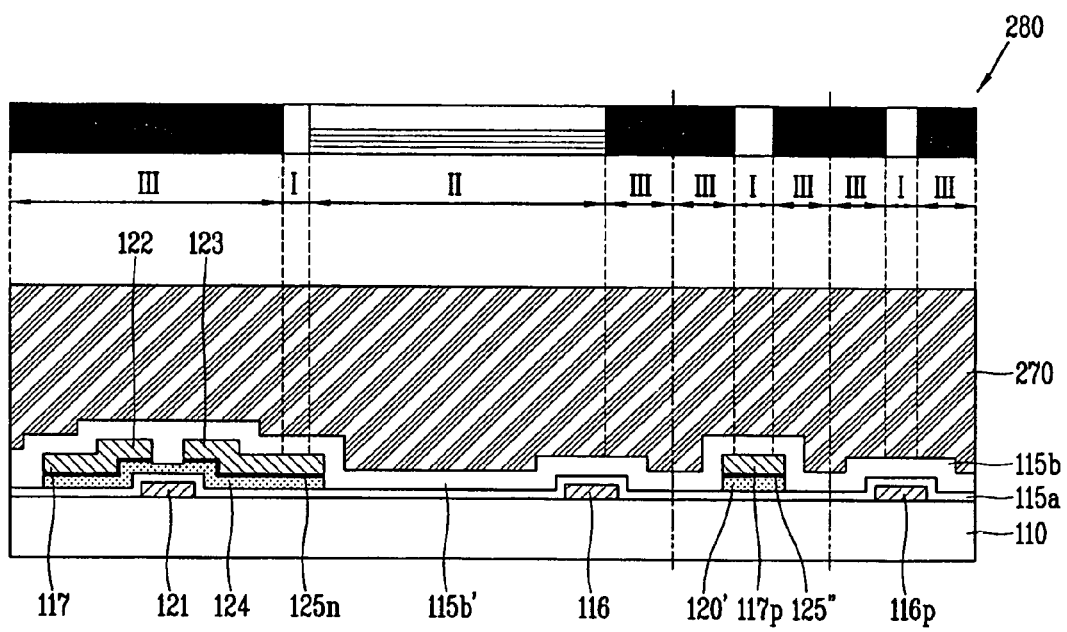

Thereafter, as shown in FIG. 7B, a second photosensitive film 270 made of a photosensitive material such as photoresist is formed on the entire surface of the array substrate 110, to which light is selectively irradiated via a half-tone mask 280.

The half-tone mask 280 includes a first transmission region (I) that allows irradiated light to be entirely transmitted therethrough, a second transmission region (II) that allows only some light to be transmitted therethrough while blocking the remaining light, and a blocking region (III) that entirely blocks the irradiated light. Only light which has transmitted through the half-tone mask 280 can be irradiated on the first photosensitive film 270.

Figure 7C:
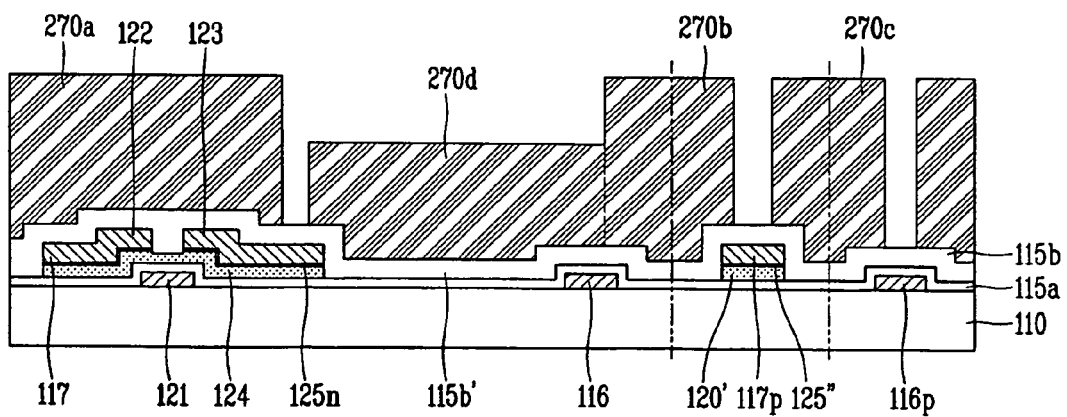

Subsequently, when the first photosensitive film 270 which has been exposed through the half-tone mask 280 is developed, as shown in FIG. 7C, first to fourth photosensitive film patterns 270a to 270d remain at regions where light has been entirely blocked or partially blocked through the blocking region (III) and the second transmission region (II), while the second photosensitive film at the transmission region (I) through which light had been entirely transmitted has been completely removed to expose the surface of the passivation layer 115b.

At this time, the first to third photosensitive film patterns 270a to 270c formed at the blocking region (III) are thicker than the fourth photosensitive film pattern 270d formed through the second transmission region (II). In addition, the second photosensitive film at the region where the light had entirely transmitted through the first transmission region (I) has been completely removed. This is because positive photoresist has been used, but without being limited thereto, negative photoresist can be also used in the present invention.

Figure 7D:
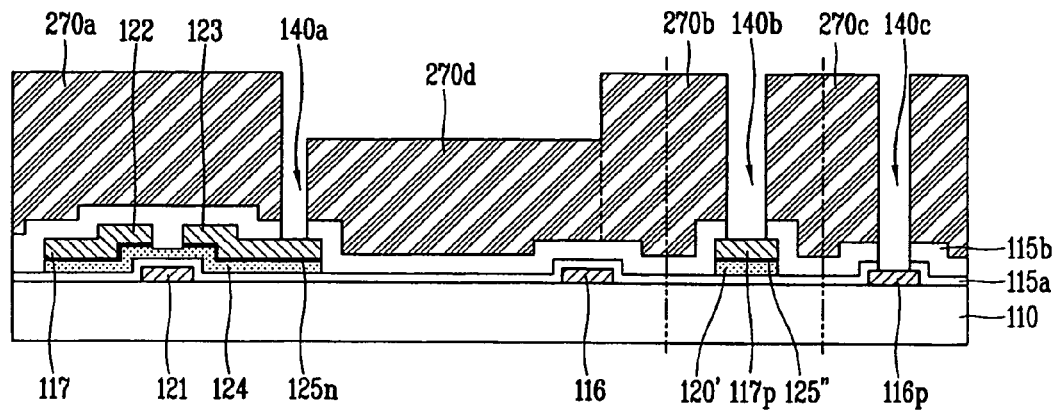

And then, as shown in FIG. 7D, a portion of the lower passivation layer 115b is selectively removed by using the first to fourth photosensitive film patterns 270a to 270d as masks to form the first contact hole 140a exposing a portion of the drain electrode 123 at the pixel part of the array substrate 110.

In addition, through the third masking process, the second and third contact holes 140b and 140c exposing portion of the data pad line 117p and the gate pad line 116p are formed at the data pad part and the gate pad part of the array substrate 110.

Figure 7E:
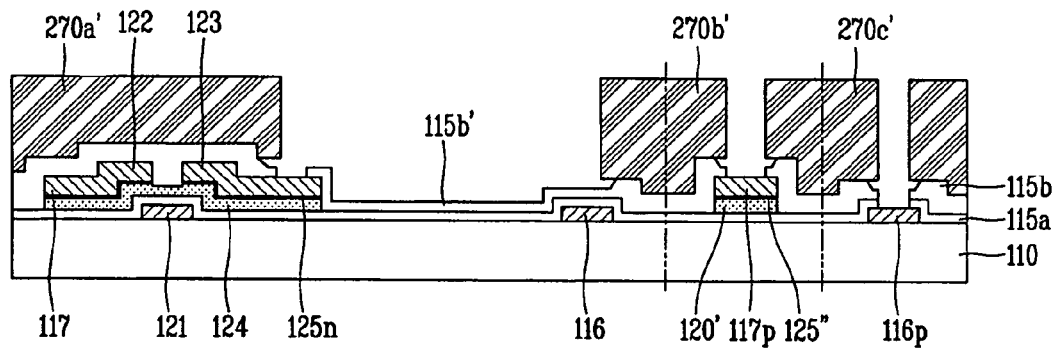

Thereafter, an ashing process is performed to partially remove the first to fourth photosensitive film patterns 270a to 270d. Then, as shown in FIG. 7E, the fourth photosensitive film pattern at the second transmission region (II) is completely removed.

Then, the first to third photosensitive film patterns remain as fifth to seventh photosensitive film patterns 270a' and 270c' by removing the thickness of the fourth photosensitive film pattern only on the regions corresponding to the blocking region (III). In this case, substantially, the first and second transmission regions (I) and (II) where the first to seventh photosensitive film patterns 270a' to 270c' do not remain refers to regions where the pixel electrode, the data pad electrode and the gate pad electrode are to be formed through a lift-off process.

Thereafter, a portion of the thickness of the passivation layer 115b at the pixel area is removed by using the fifth to seventh photosensitive film patterns 270a' to 270c' to secure an penetration path of the stripe.

In this case, as mentioned above, if the passivation layer 115b is formed as a dual-layer of the first passivation layer of high density and the second passivation layer of low density, etching is performed such that a portion of the thickness of the lower first passivation layer remains. Namely, in the process of etching the first passivation layer of high density after the upper second passivation layer of high density is etched, the etching in the horizontal direction, namely, in the lateral direction, is more actively performed than in the vertical direction of the first passivation layer, so, advantageously, the penetration path of the striper can be sufficiently secured in a state that a portion of the thickness of the first passivation layer remains.

Reference numeral 115b' denotes a passivation layer pattern formed by removing a portion of the thickness of the passivation layer 115b, and portions of the passivation layer 115b including the passivation layer pattern 115b' are etched to the sides at the lower portion of the fifth to seventh photosensitive film patterns 270a' to 270c' to form the penetration paths of the striper.

Figure 7F:
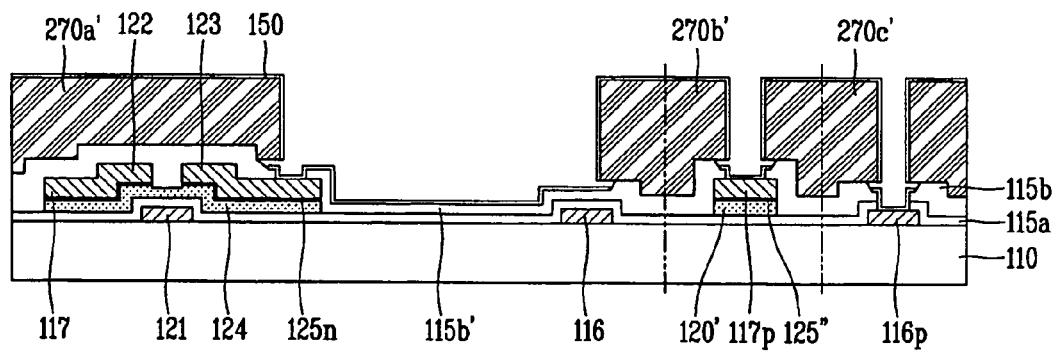

Thereafter, as shown in FIG. 7F, a third conductive film 150 is formed on the entire surface of the array substrate 110.

Figure 7G:
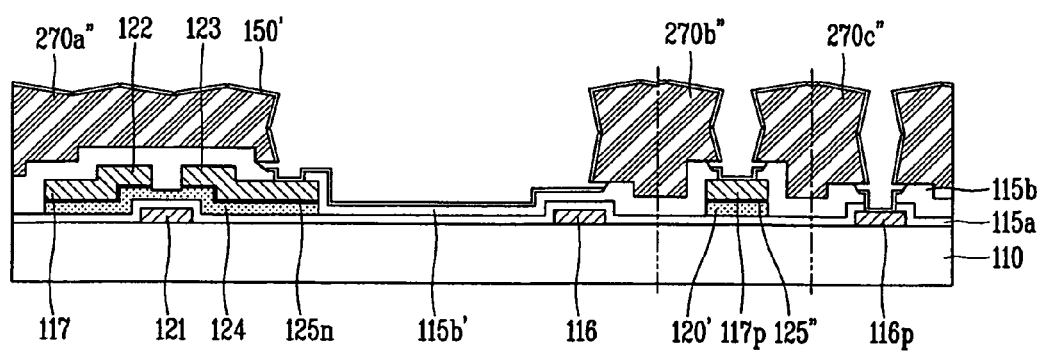

And, as shown in FIG. 7G, a heat treatment is performed before proceeding with a lift-off process to generate a crack on the third conductive film 150 formed on the fifth to seventh photosensitive film patterns 270a' to 270c'. Here, reference numeral 150' denotes a third conductive film pattern with a crack formed through the heat treatment on the surface of the fifth to seventh photosensitive film patterns 270a' to 270c'.

Figure 7H:
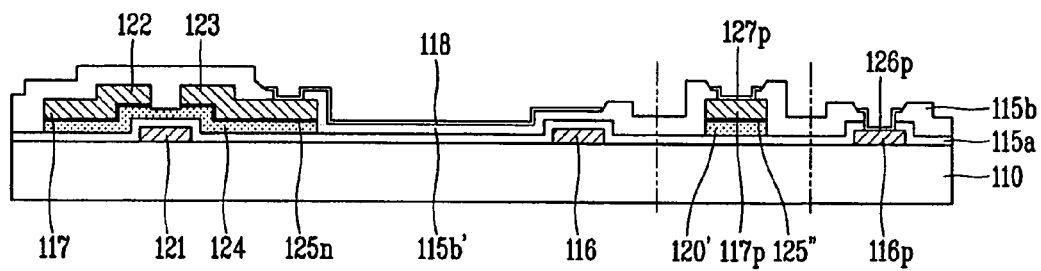

Thereafter, as shown in FIG. 7H, the third to fifth photosensitive film patterns are removed through a lift-off process to remove the third conductive film pattern remaining at portions other than the first and second transmission regions (I) and (II) together with the third to fifth photosensitive film patterns.

In this case, the third conductive film remaining at the first and second transmission regions (I) and (II), namely, within the first to third contact holes and on the passivation layer pattern 115b' of the pixel region form the pixel electrode 118 electrically connected with the drain electrode 123 via the first contact hole, and form the data pad electrode 127p and the gate pad electrode 126p electrically connected with the data pad line 117p and the gate pad line 116p via the second and third contact holes.

The lift-off process is a process in which a conductive metal material such as the third conductive film is deposited with a certain thickness on a photosensitive material such as the third to fifth photosensitive film patterns and precipitated in a solution such as the striper to remove the metal material deposited on the third to fifth photosensitive film patterns together with the third to fifth photosensitive film patterns. In this case, the metal material formed within the first to third contact holes and on the protective film pattern 115b' is not removed but remains to form the pixel electrode 118, the data pad electrode 127p and the gate pad electrode 126p.

In this case, a portion of the pixel electrode 118 is formed to overlap with a portion of a previous gate line 116 to form a storage capacitor together with the gate line 116 with the lower gate insulating layer 115a and the passivation layer pattern 115b' interposed therebetween.

FIGS. 8A to 8E are enlarged sectional views showing a portion of a thin film transistor of the array substrate while performing a lift-off operation according to the present invention.

Figure 8A:
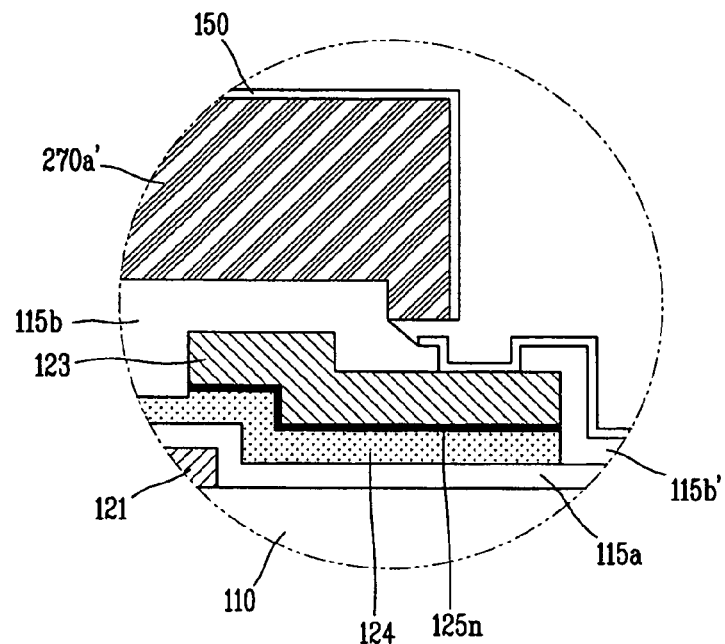
FIGS. 8A to 8E are enlarged sectional views showing a portion of a thin film transistor while performing a lift-off operation according to the present invention.

First, as shown in FIG. 8A, the third conductive film 150 is formed on the entire surface of the array substrate 110.

The third conductive film 150 is made of a transparent conductive material with good transmittance such as an ITO (Indium Tin Oxide) or an IZO (Indium Zinc Oxide) to form the pixel electrode, the gate pad electrode and the data pad electrode.

And, before performing the lift-off process, a heat treatment is performed on the array substrate 110 with the third conductive film 150 formed thereon.

The heat treatment may be performed for approximately ten to thirty minutes at about 100° C. to 150° C. by using the hot air of an oven, and if a hot plate is used, the heat treatment may be performed for approximately three to five minutes at about 130° C. to 180° C.

Figure 8B:
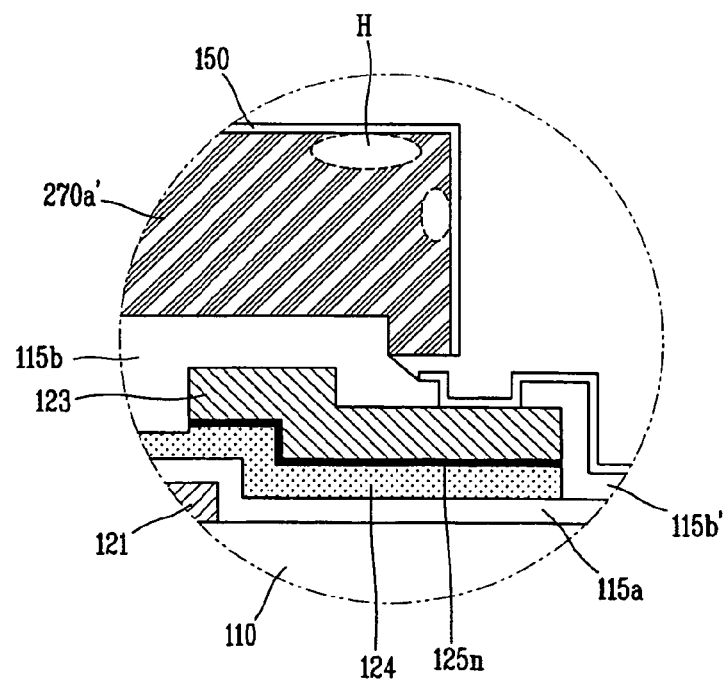

When the heat treatment is performed, as shown in FIG. 8B, a certain air gap (H) may be formed within the fifth to seventh photosensitive film patterns 270a' to 270c' and the internal pressure of the third conductive film 150 is increased.

Figure 8C:
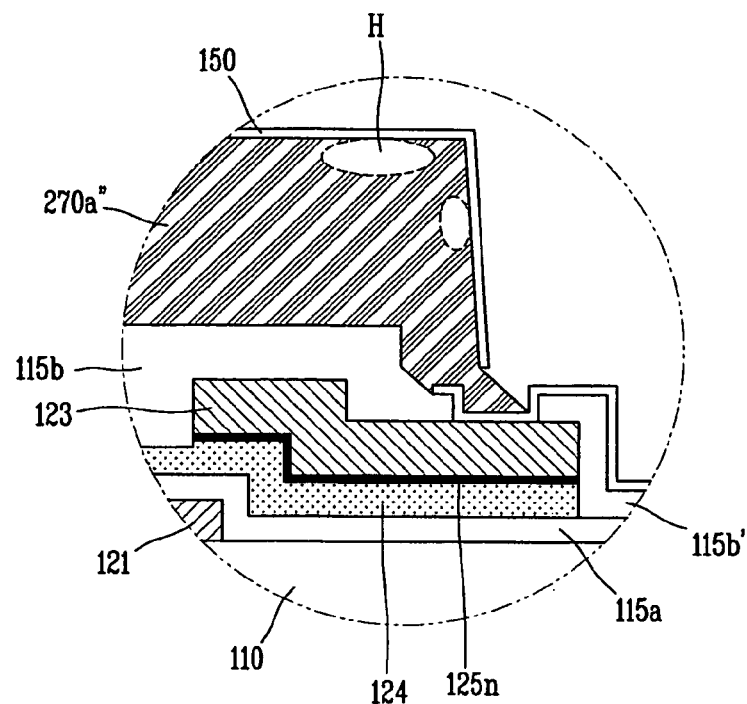

For example, when heat treatment is performed for about ten minutes at 140° C., as shown in FIG. 8C, the volume of the fifth to seventh photosensitive film patterns 270a' to 270c' expands to allow the photosensitive film to flow through the penetration path of the striper where the third conductive film 150 has not been deposited to make the third conductive film 150 on the fifth to seventh photosensitive film patterns 270a' to 270c' come off.

Figure 8D:
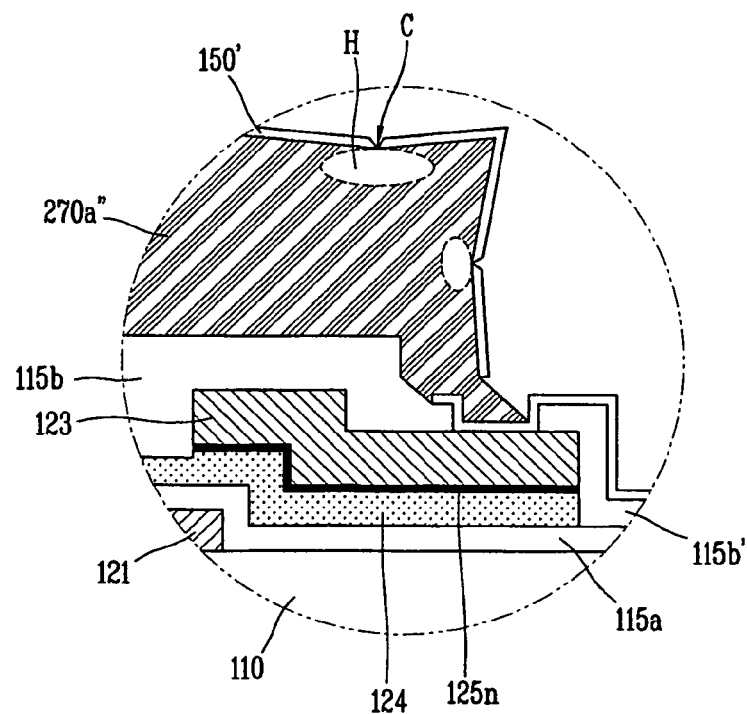

When the heat treatment is performed for about 18 to 24 minutes, as shown in FIG. 8D, a crack (C) is generated on the third conductive film which has come off by the air gap (H) and increased internal pressure.

Figure 8E:
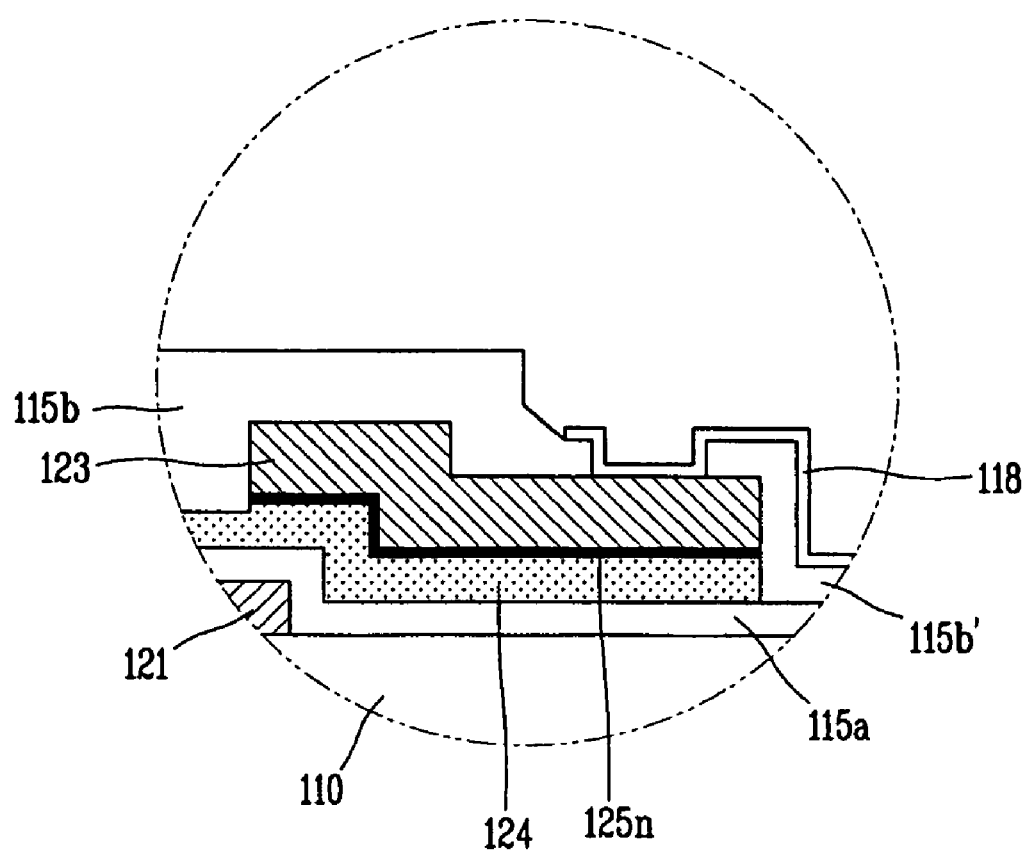

Then, with the crack generated, the third conductive film pattern 150' is released to be removed, and as shown in FIG. 8E, the striper is infiltrated into the interior of the exposed photosensitive film as the third conductive film is released, proceeding with the lift-off operation.

In the embodiment of the present invention, because the crack is previously formed on the third conductive film through the heat treatment, although the penetration path of the striper is not sufficiently secured, the lift-off process can be easily performed.

Although not shown, as for the vertical structure of the edge portion of the pixel area in which the pixel electrode extends toward the previous gate line, a portion of the thickness of the passivation layer is removed at the pixel area of the array substrate, on which the pixel electrode is formed to form a step with the periphery of the pixel area where a portion of the passivation layer has not been removed.

This is generated because the transparent conductive film is deposited after only a portion of the thickness of the passivation layer at the pixel area is removed by using the half-tone mask in performing the lift-off process, and aims to facilitate the lift-off process without such a problem of corrosion of the pad part as well as the crack of the transparent conductive film through the heat treatment.

The array substrate according to the embodiment of the present invention is attached with a color filter substrate in a facing manner by a sealant applied to outer edges of the image display part. In this case, the color filter substrates includes a black matrix that prevents leakage of light to the TFTs, the gate lines and the data lines and color filters for implementing red, green and blue colors.

The attachment of the color filter substrate and the array substrate are made through attachment keys formed on the color filter substrates or the array substrates.

In the embodiment of the present invention, as the active patterns, the amorphous silicon TFT using the amorphous silicon thin film is used as an example, but the present invention is not limited thereto and as the active patterns, polycrystalline silicon TFTs using a polycrystalline silicon thin film can be also used.

In addition, the twisted nematic (TN) mode LCD in which nematic-phase liquid crystal molecules are driven in the direction perpendicular to the substrates has been taken as an example for the description according to the embodiment of the present invention, but the present invention is not limited thereto and can be applicable to an in-plane switching (PS)

mode LCD in which liquid crystal molecules are driven in the direction horizontal to the substrates to improve the viewing angle by more than about 170° C.

The present invention can be also applied to a different type of display device fabricated by using TFTs, for example, an Organic Light Emitting Diode (OLED) display device in which OLEDs are connected with driving transistors.

It will be apparent to those skilled in the art that various modification and variation can be made without departing from the spirit or scope of the invention. Thus, it is intended that the present invention cover the modifications and variations of the invention provided they come within the scope of the appended claims and their equivalents.

What is claimed is:

1. A method for fabricating a liquid crystal display device, comprising:
    providing a first substrate divided into a pixel part and data and gate pad parts;
    depositing a first conductive film on the first substrate to form a gate electrode and a gate line at the pixel part of the first substrate through a first masking process;
    forming an insulating layer on the entire first substrate including the gate electrode and the gate line;
    forming an active pattern and source/drain electrodes at the pixel part of the first substrate and forming a data line crossing the gate line to define a pixel area through a second masking process;
    forming a passivation layer on the entire first substrate;
    forming first to third photosensitive film patterns having a first thickness and a fourth photosensitive film pattern having a second thickness on the passivation layer through a third masking process;
    selectively removing a portion of the passivation layer using the first to fourth photosensitive film pattern as a mask to form a first contact hole exposing a portion of the drain electrode;
    removing the fourth photosensitive film pattern and simultaneously forming fifth to seventh photosensitive film patterns having a third thickness;
    removing a portion of the passivation layer using the fifth to seventh photosensitive film patterns as masks to form a passivation layer with a thinner thickness than a thickness of an original passivation layer;
    forming a transparent conductive film on the entire surface of the first substrate;
    forming at least one crack on the conductive film by heat treating the first substrate;
    removing the fifth to seventh photosensitive film patterns and simultaneously removing the transparent conductive film on the fifth to seventh photosensitive film patterns to form a pixel electrode electrically connected to the drain electrode via the first contact hole; and
    attaching the first substrate and a second substrate to each other using a sealant applied to outer edges of the substrates.

2. The method of claim 1, further comprising:
    forming a gate pad line at a gate pad part of the first substrate through the first masking process.

3. The method of claim 2, further comprising:
    selectively removing portions of the passivation layer and the gate insulating layer by using the photosensitive film pattern as a mask to foam a third contact hole exposing a portion of the gate pad line.

4. The method of claim 1, further comprising:
    forming a data pad line at a data pad part of the first substrate through the second masking process.

5. The method of claim 4, further comprising:
    selectively removing a portion of the passivation layer by using the photosensitive film pattern as a mask to form a second contact hole exposing a portion of the data pad line.

6. The method of claim 1, wherein the passivation layer comprises a first passivation layer with a relatively high density and a second passivation layer with a relatively low density.

7. The method of claim 1, wherein the heat treatment is performed at a temperature of about 100° C. to 180° C.

8. The method of claim 1, wherein, through the heat treatment, an air gap is formed within the third to fifth photosensitive film patterns, the volume of the third to fifth photosensitive film patterns expands, the third conductive film comes off due to the air gap, and an internal pressure of the third conductive film is increased, to form a crack on the third conductive film.

9. The method of claim 1, wherein the second masking process comprises:
    providing a gate insulating layer, an amorphous silicon thin film, and a second conductive film on the entire surface of the first substrate including the gate electrode, the gate line and the gate pad line;
    forming a photosensitive film on the entire surface of the first substrate;
    irradiating the photosensitive film using a half-tone mask to provide first to fourth photosensitive film patterns located at blocked and partially blocked regions of the half-tone mask, wherein first to third photosensitive film patterns of the blocked region are thicker than a fourth photosensitive pattern of the partially blocked region of the half-tone mask;
    ashing to partially remove the photosensitive film patterns in the blocked region and remove the photosensitive film pattern in the partially blocked region of the half-tone mask; and
    selectively forming the source and drain electrodes on the active pattern.

10. The method of claim 1, wherein the third masking process comprises:
    providing a passivation layer on an entire surface of the first substrate including the active pattern, source electrode and drain electrode;
    forming a photosensitive film on the entire surface of the passivation layer;
    irradiating the photosensitive film using a half-tone mask to provide the first to fourth photosensitive film patterns on the passivation layer;
    ashing to partially remove the photosensitive film patterns in the blocked region and totally remove the photosensitive film patterns in the transmission region of the half-tone mask to form the fifth to seventh film patterns having a third thickness;
    selectively removing other portions of the passivation layer to form a passivation layer pattern; and
    forming a pixel electrode on the passivation layer patterns.

11. A method for fabricating a liquid crystal display, comprising:
    forming a gate electrode and a gate line on a substrate through a first making process;
    forming a gate insulating layer on the entire surface of the substrate;
    forming a semiconductor layer and source and drain electrodes separately at an upper portion of the semiconductor layer on the gate insulating layer, and forming a data line connected with the semiconductor layer and the source electrode and crossing the gate line to define a pixel area through a second masking process;

forming a passivation layer with a first thickness on the entire surface of the substrate;

forming a first photosensitive film pattern having a second thickness that corresponds to the data line, the gate electrode and the source electrode on the passivation layer, forming a second photosensitive film pattern having a third thickness thinner than the second thickness and corresponding to the pixel area of the substrate, wherein the passivation layer having the first thickness is exposed over the drain electrode through a third masking process;

removing the exposed passivation layer having the first thickness over the drain electrode by using the first and second photosensitive film patterns as masks to form a contact hole exposing a portion of the drain electrode;

performing an ashing process to remove the second photosensitive film pattern having the third thickness to expose the passivation layer having the first thickness, and simultaneously forming the first photosensitive film pattern having the second thickness as a third photosensitive film pattern with a fourth thickness that is thinner than the second thickness;

etching the exposed passivation layer having the first thickness by using the third photosensitive film pattern with the fourth thickness as a mask to form a passivation layer with a fifth thickness that is thinner than the first thickness;

forming a transparent conductive film at an upper portion of the third photosensitive film pattern having the fourth thickness and the passivation layer having the fifth thickness, the transparent conductive film contacting the drain electrode via the contact hole;

performing a heat treatment to form at least one crack on the transparent conductive film at an upper portion of the third photosensitive film pattern having the fourth thickness; and removing the third photosensitive film pattern having the fourth thickness and the upper transparent conductive film through a lift-off process to form a pixel electrode formed of the transparent conductive film at the pixel area.

12. The method of claim 11, wherein a storage capacitor is formed by extending a portion of the pixel electrode up to a previous gate line to thus form the previous gate line overlapping with the pixel electrode as a first storage electrode, the pixel electrode as a second electrode, and the gate insulation layer formed between the pixel electrode and the previous gate line and the passivation layer with the fifth thickness as a dielectric layer.

13. The method of claim 11, wherein the heat treatment is performed at a temperature of about 100° C. to 180° C.

14. The method of claim 11, wherein the heat treatment process comprises:
   forming an air gap in the third photosensitive film pattern with the fourth thickness through the heat treatment;
   expanding the volume of the third photosensitive film pattern with the fourth thickness to expand according to the formation of the air gap in the third photosensitive film pattern with the fourth thickness; and
   forming a crack on the transparent conductive film according to the expansion of the volume of the third photosensitive film pattern with the fourth thickness.

15. The method of claim 11, wherein the forming of the passivation layer with the fifth thickness comprises etching the passivation layer with the first thickness to expose a lower end of the third photosensitive film pattern with the fourth thickness.

* * * * *